(12) United States Patent
Tamada et al.

(10) Patent No.: US 10,816,840 B2
(45) Date of Patent: Oct. 27, 2020

(54) GLASS PLATE AND DISPLAY DEVICE

(71) Applicant: AGC Inc., Chiyoda-ku (JP)

(72) Inventors: Minoru Tamada, Tokyo (JP); Yusuke Kobayashi, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 110 days.

(21) Appl. No.: 16/251,396

(22) Filed: Jan. 18, 2019

(65) Prior Publication Data

US 2019/0235304 A1 Aug. 1, 2019

(30) Foreign Application Priority Data

Jan. 18, 2018 (JP) .................. 2018-006517

(51) Int. Cl.
*G02F 1/1333* (2006.01)
*G02F 1/1335* (2006.01)
(Continued)

(52) U.S. Cl.
CPC .. *G02F 1/133308* (2013.01); *B29D 11/00326* (2013.01); *B32B 17/06* (2013.01);
(Continued)

(58) Field of Classification Search
CPC ........... G02B 1/118; G02B 1/11; G02B 1/111; G02B 1/04; G02B 1/115; G02B 5/0242; G02B 1/10; G02B 5/0221; G02B 5/0278; G02B 1/18; G02B 1/105; G02B 1/14; G02B 27/0018; G02B 5/0226; G02B 5/0294; G02B 27/0006; G02B 5/3033; G02B 2207/101; G02B 2207/107; G02B 5/003; G02B 5/02; G02B 5/0215; G02B 5/0284; G02B 5/30; G02B 7/00; G02B 7/021; G02B 13/001; G02B 1/113; G02B 1/12; G02B 3/00; G02B 5/08; G02B 5/20; G02B 5/208; G02B 5/3025; G02B 5/305; G02B 13/0025; G02B 13/0035; G02B 13/0045; G02B 13/0085; G02B 13/02; G02B 13/14;
(Continued)

(56) References Cited

U.S. PATENT DOCUMENTS

2009/0230835 A1* 9/2009 Tsuchimoto ......... G02B 5/0278
313/112
2015/0316442 A1 11/2015 Tamada et al.
2015/0316690 A1 11/2015 Tamada et al.

FOREIGN PATENT DOCUMENTS

JP 2007-147343 6/2007
JP 5867649 2/2016

* cited by examiner

*Primary Examiner* — Collin X Beatty
*Assistant Examiner* — Grant A Gagnon
(74) *Attorney, Agent, or Firm* — Oblon, McClelland, Maier & Neustadt, L.L.P.

(57) ABSTRACT

The present invention relates to a glass plate including a first main surface subjected to antiglare treatment, and a second main surface opposed to the first main surface, in which a clarity index value T, a reflection image diffusiveness index value R and an anti-sparkle index value S satisfy respective relations of: clarity index value T≥0.8; reflection image diffusiveness index value R≥0.01; and anti-sparkle index value S≥0.85; and a transmission haze measured by a method according to JIS K 7136 (2000) being 15% or less. The glass plate of the present invention is excellent in clarity, reflection image diffusiveness and anti-sparkle, and also excellent in reproducibility of color.

9 Claims, 2 Drawing Sheets

(51) Int. Cl.
| | |
|---|---|
| *G02B 5/00* | (2006.01) |
| *B29D 11/00* | (2006.01) |
| *G01J 3/46* | (2006.01) |
| *H01J 29/89* | (2006.01) |
| *B32B 17/06* | (2006.01) |
| *G01B 11/00* | (2006.01) |
| *B60R 1/08* | (2006.01) |
| *G02B 27/01* | (2006.01) |
| *B60J 3/00* | (2006.01) |

(52) U.S. Cl.
CPC ............... *B60J 3/00* (2013.01); *B60R 1/088* (2013.01); *G01B 11/00* (2013.01); *G01J 3/46* (2013.01); *G02B 5/00* (2013.01); *G02B 27/01* (2013.01); *G02F 1/133502* (2013.01); *H01J 29/896* (2013.01); *G02F 2001/133331* (2013.01); *G02F 2201/38* (2013.01)

(58) Field of Classification Search
CPC ........ G02B 13/24; G02B 15/10; G02B 17/00; G02B 17/023; G02B 1/00; G02B 1/02; G02B 1/041; G02B 1/116; G02B 1/16; G02B 2027/0118; G02B 2027/0138; G02B 21/0004; G02B 21/16; G02B 21/22; G02B 21/24; G02B 2207/109; G02B 23/16; G02B 23/18; G02B 23/243; G02B 23/2446; G02B 23/2461; G02B 23/2484; G02B 23/2492; G02B 27/00; G02B 27/01; G02B 27/0101; G02B 27/022; G02B 27/1006; G02B 27/141; G02B 27/42; G02B 30/25; G02B 3/0012; G02B 3/0018; G02B 3/0031; G02B 3/0037; G02B 3/0087; G02B 3/08; G02B 3/10; G02B 5/00; G02B 5/005; G02B 5/021; G02B 5/0247; G02B 5/0263; G02B 5/0268; G02B 5/201; G02B 5/22; G02B 5/26; G02B 5/285; G02B 5/3008; G02B 5/3016; G02B 5/3058; G02B 5/3083; G02B 6/00; G02B 6/0051; G02B 6/0053; G02B 6/0086; G02B 6/0095; G02B 7/002; G02B 7/02; G02B 7/022; G02B 7/025; G02B 7/026; G02B 7/14; G02F 1/133502; G02F 1/13338; G02F 1/133528; G02F 1/133512; G02F 2201/38; G02F 1/133504; G02F 1/133526; G02F 2001/13331; G02F 2001/133388; G02F 2001/133562; G02F 2201/50; G02F 1/01; G02F 1/1333; G02F 1/133308; G02F 1/1335; G02F 1/133509; G02F 1/133514; G02F 1/133711; G02F 2001/133548; G02F 2201/503; G02F 2202/22; G02F 2202/28; G02F 2202/36; B32B 27/308; B32B 2457/20; B32B 3/30; B32B 2260/025; B32B 2262/023; B32B 2262/0238; B32B 2262/0276; B32B 2264/102; B32B 2307/3065; B32B 2307/40; B32B 2307/408; B32B 2307/412; B32B 2307/414; B32B 2307/418; B32B 2307/42; B32B 2307/584; B32B 2307/712; B32B 23/08; B32B 2457/202; B32B 27/00; B32B 27/06; B32B 27/16; B32B 27/20; B32B 27/22; B32B 27/40; B32B 33/00; B32B 5/30; B32B 7/02; B29D 11/00009; B29D 11/00346; B29D 11/0074; B29D 11/00278; B29D 11/00288; B29D 11/00307; B29D 11/00317; B29D 11/00326; B29D 11/00788
USPC ........................................................ 359/601
See application file for complete search history.

GLASS PLATE AND DISPLAY DEVICE

TECHNICAL FIELD

The present invention relates to a glass plate, and a display device provided with the glass plate.

BACKGROUND ART

Generally, a cover constituted by a transparent substrate is disposed on the display surface side of a display device such as an LCD (Liquid Crystal Display) device in order to protect the display device.

However, in the case where such a transparent substrate is disposed on the display device, things placed around the display device may be reflected on the transparent substrate when a viewer is visually recognizing an image displayed on the display device through the transparent substrate. Such reflection occurring on the transparent substrate not only makes it difficult for the viewer of the displayed image to visually recognize the displayed image, but also gives an unpleasant impression to the viewer. Particularly in a cover glass for an in-vehicle display, the distance between a driver and the display device is fixed. When a strong light source represented by sunlight is reflected, it is very difficult to visually recognize the displayed image and it is impossible to read necessary information. Consequently, it is highly likely that driving may be disturbed.

Therefore, in order to prevent such reflection, for example, used is a method for performing antiglare treatment in which asperities are made on the surface of the transparent substrate.

For those described above, Patent Literature 1 describes a method in which reflection on a display device is evaluated using a special device. However, optical characteristics required in a cover glass for an in-vehicle display or the like are not limited to only the reduction of the reflection. That is, the cover glass for an in-vehicle display is required to have predetermined levels as to optical properties in resolution or clarity, reflection image diffusiveness, anti-sparkle, etc. respectively and simultaneously. Accordingly, when a transparent substrate such as a glass plate is selected, it is insufficient to take only one of the optical properties into consideration, and it is often necessary to take a plurality of the optical properties into consideration simultaneously.

Therefore, Patent Literature 2 discloses that a glass plate having resolution, reflection image diffusiveness and anti-sparkle suitable for an in-vehicle display can be obtained if three index values of a resolution index value T, a reflection image diffusiveness index value R and an anti-sparkle index value S satisfy specified ranges respectively as a result of evaluation of the index values.

CITATION LIST

Patent Literature

[Patent Literature 1] JP-A-2007-147343
[Patent Literature 1] Japanese Patent No. 5867649

SUMMARY OF INVENTION

Problem that the Invention is to Solve

However, there is no consideration as to a color tone in addition to the aforementioned optical properties required in a cover glass for an in-vehicle display or the like, and color evaluation is generally performed using an L*a*b* color system.

In addition, there has been no report that a color tone in a displayed image to be visually recognized is improved with focusing on the fact that the color tone in the displayed image differs from a color tone in an actual image due to external white scattered light.

Therefore, an object of the present invention is to provide a glass plate, which has excellent color reproducibility, in addition to suitable clarity, suitable reflection image diffusiveness and suitable anti-sparkle.

Means for Solving the Problem

Because of intensive study by present inventors, it has been found that a transmission haze has a close relationship with the color reproducibility. Consequently, the invention has been completed.

Namely, a glass plate of the invention includes a first main surface subjected to antiglare treatment, and a second main surface opposed to the first main surface, in which:

a clarity index value T, a reflection image diffusiveness index value R and an anti-sparkle index value S quantified by methods shown below satisfy respective relations of:

clarity index value $T \geq 0.8$;
reflection image diffusiveness index value $R \geq 0.01$; and
anti-sparkle index value $S \geq 0.85$; and a transmission haze measured by a method according to JIS K 7136 (2000) is 15% or less.

Clarity index value T: By use of SMS-1000 made by DM&S GmbH & Co. KG, a glass plate is placed in a position 30 mm away from the top of a slit-like white light source of 40 mm long and 0.1 mm wide, so that the first main surface side of the glass plate faces on the light source side. Luminance is measured from above the glass plate. As a camera lens, C1614A lens having a focal length of 16 mm is used with an aperture of 5.6, and a distance between the first main surface of the glass plate and the camera lens is set at 550 mm. When a direction parallel to a thickness direction of the glass plate is regarded as an angle $\theta=0°$, and an average value of luminance within a range of the angle $\theta=0°\pm0.1°$ is taken as $T_1$, an average value of luminance within a range of the angle $\theta=0.7°\pm0.1°$ is taken as $T_2$, and an average value of luminance within a range of the angle $\theta=-0.7°\pm0.1°$ is taken as $T_3$, the clarity index value T is a value calculated by the following expression (1).

$$\text{clarity index value } T=1-(T_2+T_3)/(2\times T_1) \quad \text{expression (1)}$$

Reflection image diffusiveness index value R: By use of the SMS-1000 made by DM&S GmbH & Co. KG, slit-like light of 101 mm wide is radiated from the first main surface side to the glass plate, and luminance of light reflected thereon is measured. As a camera lens, C1614A lens having a focal length of 16 mm is used with an aperture of 5.6. A distance between the first main surface of the glass plate and the camera lens is set at 300 mm, and an imaging scale is set within a range of 0.0276-0.0278. When a direction parallel to the thickness direction of the glass plate is regarded as an angle $\phi=0°$, the aforementioned light is radiated from an angle $\phi=5.7°\pm0.1°$, and the angle $\phi=-5.7°$ at specular reflection is regarded as reference (an angle $\alpha=0°$). When an average value of luminance of the reflected light within a range of the angle $\alpha=0°\pm0.1°$ is taken as $R_1$, an average value of luminance of the reflected light within a range of the angle $\alpha=0.5°\pm0.1°$ is taken as $R_2$, and an average value of luminance of the reflected light within a range of the angle $\alpha=-0.5°\pm0.1°$ is taken as $R_3$, the reflection image diffusiveness index value R is a value calculated by the following expression (2).

reflection image diffusiveness index value $R=(R_2+R_3)/(2\times R_1)$ expression (2)

Anti-sparkle index value S: The glass plate is disposed so that the second main surface of the glass plate contacts with the display surface side of a display device with a resolution of 264 ppi. With a single-color image of green composed of RGB (0, 255, 0) being displayed on the display device, a sparkle value is obtained by image analysis using the SMS-1000 made by DM&S GmbH & Co. KG, which is placed above the glass plate. The sparkle value obtained thus is regarded as sparkle $S_a$. A distanced between a solid-state image sensor and the glass plate is set at 540 mm, and as a camera lens, 23FM50SP lens having a focal length of 50 mm is used with an aperture of 5.6. A glass substrate (VRD140 glass; made by AGC Glass Europe) having the same thickness as the aforementioned glass plate is also used as a reference sample, and image analysis is performed under similar conditions. A sparkle value thus obtained is regarded as S. From the values $S_a$ and $S_s$, the anti-sparkle index value S is calculated by the following expression (3).

anti-sparkle index value $S=1-(S_a/S_s)$ expression (3)

One embodiment of the invention is the glass plate, in which:
the clarity index value T, the reflection image diffusiveness index value R and the anti-sparkle index value S satisfy respective relations of:
the clarity index value $T\geq 0.85$;
the reflection image diffusiveness index value $R\geq 0.02$; and
the anti-sparkle index value $S\geq 0.88$; and
the transmission haze is 7% or less.

One embodiment of the invention is the glass plate, in which an antireflection layer is provided on at least a part of the first main surface.

One embodiment of the invention is the glass plate, in which an antifouling layer is provided on an outermost surface of the first main surface side.

One embodiment of the invention is the glass plate, in which a printed layer is provided on at least a part of the second main surface.

One embodiment of the invention is the glass plate, in which the glass plate is soda lime glass or aluminosilicate glass.

One embodiment of the invention is the glass plate, in which at least one of the first main surface and the second main surface is subjected to chemically strengthening treatment.

One embodiment of the invention is the glass plate, wherein a bent portion is provided in at least one of the first main surface and the second main surface.

A display device of the invention includes the glass plate described above, and a light emitting body.

Advantage of the Invention

According to a glass plate of the invention, it is possible to provide a display device, which has excellent color reproducibility in addition to suitable clarity, suitable reflection image diffusiveness and suitable anti-sparkle.

BRIEF DESCRIPTION OF THE DRAWINGS

FIG. 4A and FIG. 4B are schematic sectional views showing embodiments of glass plates of the present invention.

MODE FOR CARRYING OUT THE INVENTION

The present invention will be described below in detail. In the present description, the sign "–" designating a numerical range will be used as a denotation of a range including numerical values on both sides of the sign as an upper limit value and a lower limit value of the range.

[Glass Plate]

A glass plate according to the invention is a glass plate having a first main surface subjected to antiglare treatment, and a second main surface opposed to the first main surface, wherein:
a clarity index value T, a reflection image diffusiveness index value R, and an anti-sparkle index value S quantified by methods, which will be described later, satisfy respective relations of:
clarity index value $T\geq 0.8$;
reflection image diffusiveness index value $R\geq 0.01$; and
anti-sparkle index value $S\geq 0.85$; and
a transmission haze measured by a method according to JIS K 7136 (2000) is 15% or less.

The clarity index value expresses the extent to which an image obtained by visually recognizing a displayed image through a glass plate matches with the displayed image. It has been confirmed that the clarity correlates with a result of visual determination of a viewer about clarity (resolution), and behaves closely to a visual sense of a human being. For example, a glass plate whose clarity index value T shows a small value (close to 0) has poor clarity. On the contrary, a glass plate whose clarity index value T shows a large value has good clarity. Accordingly, the clarity index value T can be used as a quantitative index for determining clarity of a glass plate.

The clarity index value T is quantified in the following method.

By use of SMS-1000 (analyzer) made by DM&S (Display-Messtechnik & Systeme GmbH & Co. KG), the glass plate is placed in a position 30 mm away from the top of a slit-like white light source of 40 mm long and 0.1 mm wide so that the first main surface side faces on the light source side, and luminance is measured from above the glass plate. As a camera lens, C1614A lens having a focal length of 16 mm is used with an aperture of 5.6, and a distance between the first main surface of the glass plate and the camera lens is set at 550 mm. When a direction parallel to the thickness direction of the glass plate is regarded as an angle $\theta=0°$, and an average value of luminance within a range of the angle $\theta=0°\pm0.1°$ is taken as $T_1$, an average value of luminance within a range of the angle $\theta=0.7°\pm0.1°$ is taken as $T_2$, and an average value of luminance within a range of the angle $\theta=-0.7°\pm0.1°$ is taken as $T_3$, the clarity index value T is a value calculated by the following expression (1):

clarity index value $T=1-(T_2+T_3)/(2\times T_1)$ expression (1)

Figure 1:
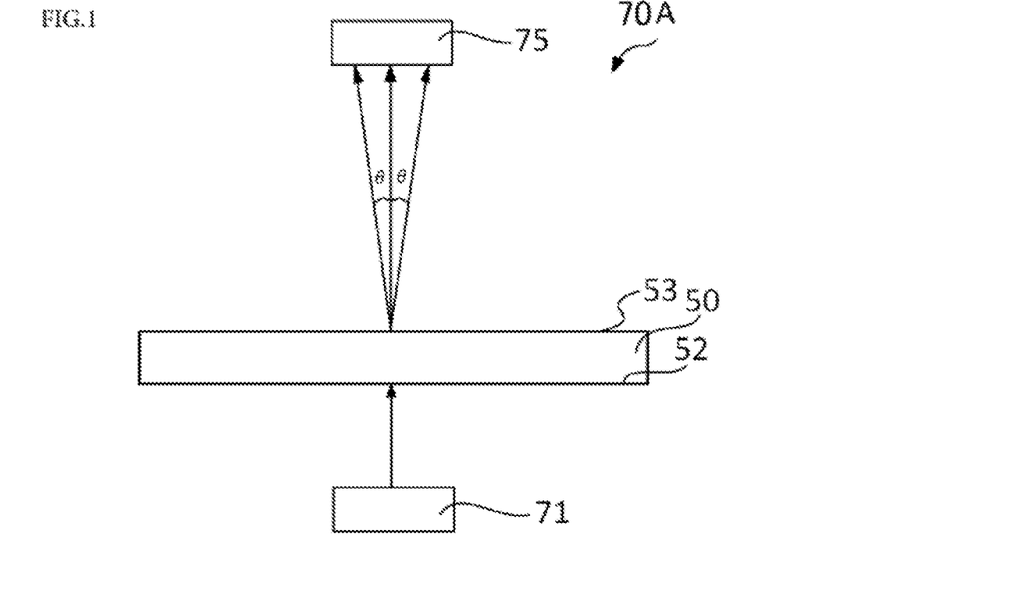
FIG. 1 is a schematic view showing an example of a measuring apparatus to be used for measuring a clarity index value T.

More specifically, one embodiment of the method for measuring the clarity index value T of a glass plate 50 will be described with reference to FIG. 1.

A measuring apparatus 70A has a light source 71 and a detector (analyzer) 75, and a sample to be measured, that is, the glass plate 50 is disposed inside the measuring apparatus 70A. The glass plate 50 has a first main surface 52 subjected to antiglare treatment, and a second main surface 53. The light source 71 radiates first light in a direction parallel to the thickness direction of the glass plate 50 toward the glass plate 50 from the first main surface 52 side. The first light is transmitted through the glass plate 50, and luminance of the transmitted light is detected and analyzed by the detector (analyzer) 75 located on the second main surface 53 side of the glass plate 50.

With the direction parallel to the thickness direction of the glass plate 50 being regarded as the angle $\theta=0°$, the clarity index value T of the glass plate 50 is calculated by the aforementioned expression (1) based on the average value ($T_1$) of the luminance detected within the range of the angle $\theta=0°\pm0.1°$, the average value ($T_2$) of the luminance detected within the range of the angle $\theta=0.7°\pm0.1°$, and the average value ($T_3$) of the luminance detected within the range of the angle $\theta=-0.7°\pm0.1°$.

Here, the minus (−) sign in the angle $\theta$ indicates counterclockwise inclination with respect to the incident first light, and the plus (+) sign indicates clockwise inclination with respect to the incident first light.

The reflection image diffusiveness index value expresses the extent to which a reflection image of an object (such as a lighting) placed around the glass plate matches with the original object. It has been confirmed that the reflection image diffusiveness index value correlates with a result of visual determination of a viewer about an antiglare property, and behaves closely to a visual sense of a human being. For example, a glass plate whose reflection image diffusiveness index value R shows a small value (close to 0) has a poor antiglare property. On the contrary, a glass plate whose reflection image diffusiveness index value R shows a large value (large closely to 1) has a good antiglare property.

The reflection image diffusiveness index value R is quantified in the following method.

By use of the SMS-1000 made by DM&S GmbH & Co. KG, slit-like light of 101 mm wide is radiated to the glass plate from the first main surface side, and luminance of light reflected thereon is measured. As a camera lens, C1614A lens having a focal length of 16 mm is used with an aperture of 5.6. A distance between the first main surface of the glass plate and the camera lens is set at 300 mm, and an imaging scale is set within a range of 0.0276-0.0278. When a direction parallel to the thickness direction of the glass plate is regarded as an angle $\phi=0°$, the aforementioned light is radiated from an angle $\theta=5.7°\pm0.1°$, and the angle $\theta=-5.7°$ at specular reflection is regarded as reference (an angle $\alpha=0°$). When an average value of luminance of the reflected light within a range of the angle $\alpha=0°\pm0.1°$ is taken as $R_1$, an average value of luminance of the reflected light within a range of the angle $\alpha=0.5°\pm0.1°$ is taken as $R_2$, and an average value of luminance of the reflected light within a range of the angle $\alpha=-0.5°\pm0.1°$ is taken as $R_3$, the reflection image diffusiveness index value R is a value calculated by the following expression (2).

$$\text{reflection image diffusiveness index value } R=(R_2+R_3)/(2\times R_1) \quad \text{expression (2)}$$

More specifically, one embodiment of the method for measuring the reflection image diffusiveness index value R of the glass plate 50 will be described with reference to FIG. 2.

A measuring apparatus 70B has a light source 71 and a detector (analyzer) 75, and a sample to be measured, that is, the glass plate 50 is disposed inside the measuring apparatus 70B so that the first main surface 52 faces on the side of the light source 71 and the detector 75. A black plate 51 is placed on the second main surface 53 side of the glass plate 50. The light source 71 radiates slit-like second light 731 having a width of 101 mm, toward the glass plate 50. The detector (analyzer) 75 receives reflected light reflected at a predetermined angle from the first main surface 52, and analyzes luminance thereof.

For measurement, the second light 731 is radiated from the light source 71 of the measuring apparatus 70B toward the glass plate 50. When a direction parallel to a direction of a normal line L of the glass plate 50 (that is, the thickness direction of the glass plate) is taken as the angle $\phi=0°$, the second light 731 is radiated to the glass plate 50 so as to be inclined clockwise at an angle of 5.7° (as shown by $\phi$ in FIG. 2). Here, actual measurement includes an error. More correctly, therefore, the angle $\phi$ includes a range of $5.7°\pm0.1°$.

Next, by use of the detector (analyzer) 75, of the light incident on the first main surface 52 of the glass plate 50, specularly reflected light (hereinafter referred to as "first reflected light 733") is detected, and an average value $R_1$ of luminance thereof is analyzed and calculated.

Figure 2:
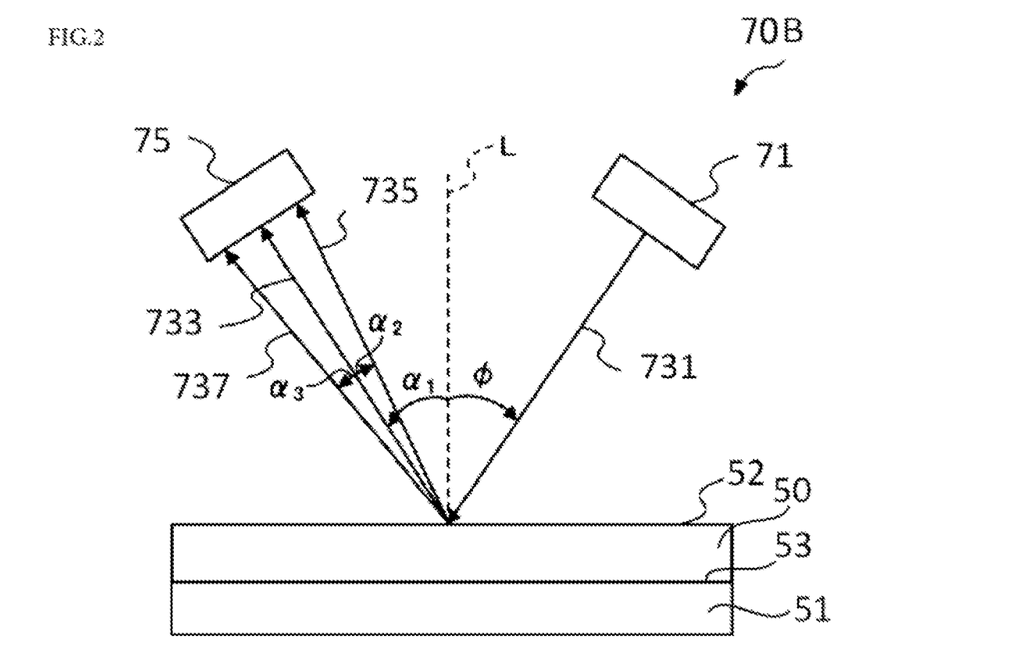
FIG. 2 is a schematic view showing an example of a measuring apparatus to be used for measuring a reflection image diffusiveness index value R.

Here, in actual measurement, the angle of the first reflected light 733 with respect to the normal line L is −(incident angle) °, and therefore $-5.7°\pm0.1°$ (shown by $\alpha_1$ in FIG. 2). The minus (−) sign indicates that the angle is inclined counterclockwise with respect to the normal line L, and the plus (+) sign indicates that the angle is inclined clockwise with respect to the normal line.

Here, the first reflected light 733 is reflected within the angle $\alpha=0°\pm0.1°$ ($=\alpha_1$) based on the direction (angle $\alpha=0°$) inclined at −5.7° with respect to the normal line L.

In the same manner, an average value $R_2$ of luminance of reflected light (hereinafter referred to as "second reflected light 735") reflected from the first main surface 52 of the glass plate 50 at a second angle $\alpha_2$ expressed by the angle $\alpha=0.5°\pm0.1°$ based on the direction (angle $\alpha=0°$) inclined at −5.7° with respect to the normal line L, and an average value $R_3$ of luminance of reflected light (hereinafter referred to as "third reflected light 737") reflected likewise at a third angle $\alpha_3$ expressed by the angle $\alpha=-0.5°\pm0.1°$ are measured.

By use of the obtained luminance values $R_1$, $R_2$ and $R_3$, the reflection image diffusiveness index value R of the glass plate 50 is calculated by the aforementioned expression (2).

The anti-sparkle index value expresses the extent to which random pattern of small dots caused by mutual interference of lights scattered by the glass plate surface when light (image) from the displayed image is transmitted through the glass plate is observed. It has been confirmed that the anti-sparkle index value correlates with a result of visual determination of a viewer about sparkle, and behaves closely to a visual sense of a human being. For example, a glass plate whose anti-sparkle index value S is small has conspicuous sparkle. On the contrary, a glass plate whose anti-sparkle index value S is large tends to have reduced sparkle.

The anti-sparkle index value S is quantified in the following method.

The glass plate is disposed so that the aforementioned second main surface contacts with the display surface side of a display device with a resolution of 264 ppi. With a single-color image of green composed of RGB (0, 255, 0) being displayed on the display device, a sparkle value is obtained by image analysis using the SMS-1000 made by DM&S GmbH & Co. KG, which is placed above the glass plate. The sparkle value thus obtained is regarded as sparkle $S_a$. A distance d between a solid-state image sensor and the glass plate is set at 540 mm, and as a camera lens, 23FM50SP lens having a focal length of 50 mm is used with an aperture of 5.6. In addition, a glass substrate (VRD140 glass; made by AGC Glass Europe) having the same thickness as the aforementioned glass plate is used as a reference sample, and image analysis is performed under similar conditions. A sparkle value thus obtained is regarded as sparkle $S_s$. From the values $S_a$ and $S_s$, the anti-sparkle index value S is calculated by the following expression (3).

anti-sparkle index value $S=1-(S_a/S_s)$                 expression (3)

Here, the reason why the single-color image of green composed of RGB (0, 255, 0) is displayed on the display device is that green is a color high in visual sensitivity and easy to visually recognize.

In addition, when the distance d=540 mm between the solid-state image sensor and the glass plate is expressed by a distance index r, it corresponds to r=10.8. The distance index r is expressed by the following expression (3-1) using a focal length f of the solid-state image sensor and the distance d between the solid-state image sensor and the transparent substrate.

distance index $r=$(distance $d$ between solid-state image sensor and transparent substrate)/(focal length $f$ of solid-state image sensor)                 expression (3-1)

Figure 3:
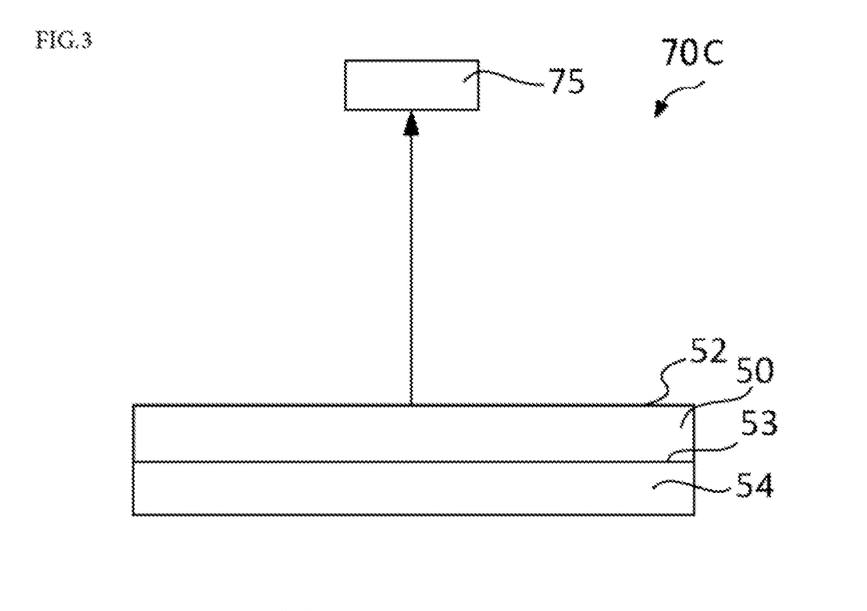
FIG. 3 is a schematic view showing an example of a measuring apparatus to be used for measuring an anti-sparkle index value S.

More specifically, one embodiment of the method for measuring the anti-sparkle index value S of the glass substrate 50 will be described with reference to FIG. 3.

A sample to be measured, that is, the glass plate 50 and a display device 54 with a resolution of 264 ppi are placed in a measuring apparatus 70C so that a detector 75 is disposed on the first main surface 52 side of the glass plate 50 while the display device 54 contacts with the second main surface 53 of the glass plate 50. For the display device 54, an LCD panel, for example, may be used. A single-color image of green composed of RGB (0, 255, 0) is displayed on the display device 54, and the image transmitted through the glass plate 50 is analyzed by use of the detector (analyzer) 75. A sparkle value obtained from a result of the image analysis is regarded as sparkle $S_a$.

The anti-sparkle index value S of the glass plate 50 is calculated by the aforementioned expression (3) from the sparkle $S_a$, and sparkle $S_s$ obtained on similar conditions for the reference sample which is a glass substrate (VRD140 glass; made by AGC Glass Europe) having the same thickness as the glass plate 50.

The transmission haze expresses transmittance loss caused by surface reflection (Fresnel reflection) occurring in accordance with a difference in refractive index between the glass plate and the air when light is incident on the glass plate. The transmission haze is measured by a method according to JIS K 7136 (2000). The contents of the JIS K 7136 (2000) is incorporated herein by reference.

Specifically the transmission haze is quantified by the following method.

By use of a haze meter HZ-1 made by Suga Test Instruments Co., Ltd., the glass plate is placed above a light source so that the aforementioned first main surface side faces on the light source side, and transmitted light is measured from above the glass plate.

When a direction parallel to the thickness direction of the glass plate is regarded as an angle of 0°, light detected within ±2.5° is regarded as transmitted light, and light detected below −2.5° or beyond 2.5° is regarded as scattered light (transmitted light loss). A ratio of the scattered light to the sum of the transmitted light and the scattered light, i.e., the total amount of light transmission, is regarded as transmission haze (%).

The transmission haze expresses transmittance loss. Conventionally, the transmission loss has been known as a property affecting uniformity of visual appearance because scattering of light increases whiteness to provide shading easily. However, according to the present invention, it is also newly found that the value of the transmission haze correlates with the extent to which a color tone in a displayed image visually recognized through the glass plate differs from a color tone in an actual image.

That is, as the value of the transmission haze is lower, the color tone in the displayed image recognized visually is closer to the color tone in the actual image, and more excellent in reproducibility of color.

The phrase "excellent in reproducibility of color" means that, for example, when a printed layer is provided on at least a part of the second main surface of the glass plate, an actual color tone of the printed layer is the same as or substantially the same as a color tone of the printed layer recognized visually from the first main surface side of the glass plate. In addition, when the glass plate is placed so that the second main surface of the glass plate contacts on a displayed image, excellent reproducibility of color means that an actual color tone of the displayed image is the same as or substantially the same as a color tone of the displayed image recognized visually from the first main surface side of the glass plate. Herein, "excellent in reproducibility of color" is synonymous with "excellent in clearness of color".

As described above, the value of the transmission haze correlates with the difference between the color tone of the displayed image recognized visually through the glass plate and the actual color tone thereof. Therefore, the present invention also relates to a method for evaluating the reproducibility of color through the glass plate by use of the value of the transmission haze. The color tone as a target to be evaluated about reproducibility of color may be limited to a single color. For example, the color tone may be limited to black. Thus, the method may be used for evaluating a black tone through the glass plate by use of the value of the transmission haze.

In this manner, in the method for evaluating the reproducibility of color or the black tone by use of the value of the transmission haze, the fact that the value of the transmission haze is smaller means that the reproducibility of color is higher, or the back tone is not a gray tone but a clear black tone.

In addition, in the method for evaluating the reproducibility of color or the black tone, the target to be evaluated is not limited to the color or the black tone recognized visually through the glass plate, but may be a color or a black tone recognized visually through a transparent plate which is, for example, made of plastic such as polycarbonate or organic glass, amorphous resin such as acrylic resin or Cytop®, or the like. That is, the present invention also relates to a method for evaluating reproducibility of color or a black tone through a transparent plate by use of a value of a transmission haze.

In the glass plate according to the present invention, the aforementioned four optical properties are to be determined.

That is, the clarity index value T is 0.8 or more, preferably 0.85 or more, and more preferably 0.9 or more. The higher the clarity index value T is, the more preferable it is. The upper limit of the clarity index value T is 1.0.

The reflection image diffusiveness index value R is 0.01 or more, preferably 0.02 or more, and more preferably 0.1 or more. When the reflection image diffusiveness index value R is not lower than the lower limit, it is possible to obtain an effect that information displayed on a display body can be grasped even in the presence of external light. For the upper limit, the reflection image diffusiveness index value R is preferably 0.95 or less, and more preferably 0.9 or less. When the reflection image diffusiveness index value R is not higher than the upper limit, it is possible to obtain an effect that "whiteout" can be prevented. The "whiteout" is a phenomenon that the whole surface of the glass plate cannot be recognized visually due to scattered light when very intense external light falls thereon.

The anti-sparkle index value S is 0.85 or more, preferably 0.88 or more, and more preferably 0.93 or more. The higher the anti-sparkle index value S is, the more preferable it is, because the clarity of information displayed on a display body is more improved. The upper limit of the anti-sparkle index value S is 1.0.

The transmission haze is 15% or less, preferably 10% or less, more preferably 7% or less, and even more preferably less than 5%. The lower the transmission haze is, the more preferable it is, because the reproducibility of color can be more improved.

According to the present invention, the four optical properties are quantified. In total consideration of those quantified optical properties, a glass plate can be selected properly in accordance with application. In addition, objective and quantitative determination can be also made on the glass plate.

Figure 4A:
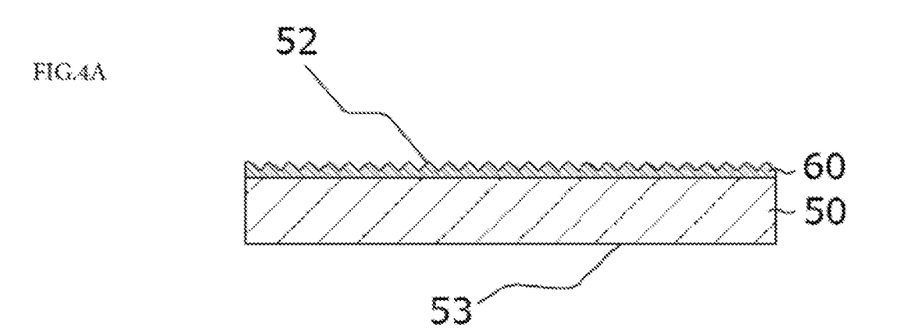
FIG. 4A shows a glass plate having a first main surface subjected to antiglare treatment.

In the glass plate according to the invention, the first main surface 52 is subjected to antiglare treatment, as shown in FIG. 4A. In other words, the first main surface of the glass plate according to the invention is an antiglare-treated layer 60. The antiglare treatment is a processing method for reducing reflection of reflected light from the light source to the glass plate. The antiglare treatment is a treatment method in which micro asperities are formed in the surface of the glass plate. Due to the antiglare treatment, it is possible to achieve reduction of specular reflection, improvement of feeling with a finger, improvement of antifouling, etc., and it is also possible to achieve the aforementioned four optical properties.

Arithmetic average roughness Ra of the antiglare-treated first main surface of the glass plate is not particularly limited as long as the aforementioned four optical properties can be obtained. For example, the arithmetic average roughness Ra is preferably set at 0.05 μm or more to increase the reflection image diffusiveness index value R. The arithmetic average roughness Ra is more preferably 0.07 μm or more. On the other hand, the arithmetic average roughness Ra is preferably set at 0.5 μm or less in order to reduce interference of light caused by the asperities of the glass surface so that the anti-sparkle index value can be increased. The arithmetic average roughness Ra is more preferably 0.4 μm or less.

Here, the arithmetic average roughness Ra is measured by a method according to JIS B 0601:2001 (ISO4287: 1997). The contents of JIS B 0601:2001 (ISO4287: 1997) is incorporated herein by reference.

Average length RSm of a roughness curve element in the antiglare-treated first main surface of the glass plate is not particularly limited as long as the aforementioned four optical properties can be obtained. For example, the average length RSm is preferably set at 5 μm or more to increase the reflection image diffusiveness index value R. The average length RSm is more preferably 8 μm or more. On the other hand, the average length RSm is preferably set at 30 μm or less in order to reduce interference of light caused by the asperities of the glass surface so that the anti-sparkle index value S can be increased. The average length RSm is more preferably 25 μm or less.

Here, the average length RSm of the roughness curve element is measured by a method according to JIS B 0601:2001 (ISO4287: 1997).

The glass plate may have an antireflection layer (AR layer) on at least a part of the first main surface. When the antireflection layer is provided, an effect of reducing the reflectivity is provided to reduce glare caused by reflection of light. In addition, when the glass plate is used in an image display device, it is possible to improve the transmittance of light from the image display device so that the clarity in the image display device can be improved. When another functional layer such as an antiglare layer is formed on the first main surface of the glass plate, the antireflection layer may be formed on the other functional layer.

The material of the antireflection layer is not particularly limited, but a known material may be used by a known method. For example, the antireflection layer may have a configuration in which a plurality of layers including a high refractive index layer and a low refractive index layer are stacked.

In this case, for example, the high refractive index layer may have a refractive index of 1.9 or higher at a wavelength of 550 nm and a low refractive index layer may have a refractive index of 1.6 or lower at the wavelength of 550 nm. In addition, the antireflection layer may have a configuration including a layer in which hollow particles or voids are mixed in a matrix of the layer so that the refractive index of the layer is 1.2-1.4 at the wavelength of 550 nm.

The antireflection layer may have a layer configuration including a single high refractive index layer and a single low refractive index layer. Alternatively, the antireflection layer may be configured to include two or more high refractive index layers and two or more low refractive index layers. When the antireflection layer includes two or more high refractive index layers and two or more low refractive index layers, it is preferable that the antireflection layer has a form in which the high refractive index layers and the low refractive index layers are stacked alternately. Further, the antireflection layer may have a configuration including only one low refractive index layer.

In order to enhance the antireflection property, it is preferable that the antireflection layer is a stack in which a plurality of layers are stacked. As the number of stacked layers increases, an optical design can be made to provide a layer configuration in which lower reflectivity can be achieved over a wider wavelength range. For example, the number of layers laminated in the laminate is preferably 2 or more and 8 or less as a whole, and more preferably 2 or more and 6 or less from the viewpoint of the effect of reduction in reflectivity and the mass productivity. The laminate here is preferably a laminate in which high refractive index layers and low refractive index layers are laminated as described above. In this case, it is preferable that the total sum of the number of the high refractive index layers and the number of the low refractive index layers is within the aforementioned range.

The materials of each high refractive index layer and each low refractive index layer are not particularly limited, and may be selected suitably in consideration of a required degree of antireflection, required productivity, and so on. Regarding the material forming the high refractive index layer, at least one kind selected from niobium oxide ($Nb_2O_5$), titanium oxide ($TiO_2$), zirconium oxide ($ZrO_2$), tantalum oxide ($Ta_2O_5$) and silicon nitride (SiN) may be preferably used. Regarding the material forming the low refractive index layer, at least one kind selected from silicon oxide ($SiO_2$), a material containing a composite oxide of Si and Sn, a material containing a composite oxide of Si and Zr, and a material containing a composite oxide of Si and Al may be preferably used.

In terms of productivity or refractive indexes, it is preferable that the high refractive index layer contains one kind selected from niobium oxide, tantalum oxide and silicon nitride, and the low refractive index layer contains silicon oxide.

The glass plate may have an antifouling layer in at least a part of the first main surface. The antifouling layer is a layer, which prevents adhesion of an organic material or an inorganic material to the surface, or a layer, which provides an effect that even when an organic material or an inorganic material adheres to the surface, the adhering material can be eliminated easily by cleaning such as wiping.

When the glass plate has an antifouling layer, it is preferable that the antifouling layer is formed in the outermost surface on the first main surface side of the glass plate in order to obtain the aforementioned effect, and it is preferable that the antifouling layer is formed on the antireflection layer or another functional layer. The antifouling layer is not particularly limited as long as it can give an antifouling property to the glass plate. For example, the antifouling layer is preferably made of a coating of a fluorine-containing organic silicon compound obtained by curing the fluorine-containing organic silicon compound by hydrolysis/condensation reaction thereof.

The thickness of the antifouling layer is not particularly limited. When the antifouling layer is made of a coating of a fluorine-containing organic silicon compound, the thickness of the antifouling layer is preferably 2-20 nm, more preferably 2-15 nm, and even more preferably 2-10 nm. When the thickness of the antifouling layer is 2 nm or more, the glass plate can be covered with the antifouling layer uniformly enough to withstand practical use in terms of friction resistance. On the other hand, when the thickness of the antifouling layer is 20 nm or less, the glass plate on which the antifouling layer has been formed has good optical properties.

The glass plate may have other functional layers. Examples of the other functional layers include an antiglare layer, an infrared ray cut layer, an ultraviolet ray cut layer, a water repellent layer, an antistatic layer, a printed layer, an undercoat layer, an adhesion improving layer, a protective layer, etc. As those functional layers, known materials may be used by known methods.

Figure 4B:
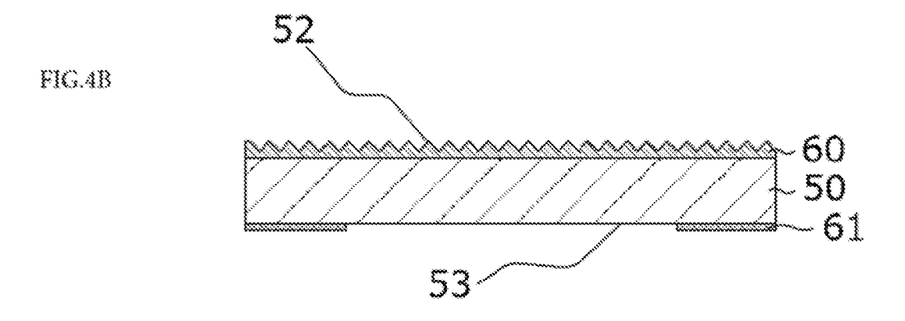
FIG. 4B shows a glass plate having a first main surface subjected to antiglare treatment, and a second main surface partially provided with a printed layer.

When the glass plate is, for example, used as a cover glass for a display device or a cover glass for a panel display or the like, the printed layer is preferably provided on at least a part of the second main surface 53 of the glass plate as shown in FIG. 4B. Particularly, it is preferable that a printed layer 61 is provided like a frame along a peripheral edge portion of the second main surface 53. In addition, due to the printed layer, the glass plate can be used as a decorative glass.

[Manufacturing Method of Glass Plate]

The glass plate is made of alkali-free glass, soda lime glass, soda lime silicate glass, aluminosilicate glass, borate glass, lithium aluminosilicate glass, borosilicate glass, etc.

When the glass plate is used as a cover glass for an in-vehicle display, the thickness of the glass plate is preferably 3 mm or less in order to reduce the weight of a vehicle body. In addition, in order to prevent the glass plate from being damaged due to external stress applied thereto, it is preferable to introduce a compressive stress layer in the outermost surface of the glass plate. To make the both compatible, it is preferable to perform chemically strengthening treatment using ion exchange treatment. The glass plate is preferably made of soda lime glass or aluminosilicate glass because ion exchange can be performed easily.

As a more specific glass composition, a glass containing 50-80% of $SiO_2$, 0.1-25% of $Al_2O_3$, 3-30% of $Li_2O+Na_2O+K_2O$, 0-25% of MgO, 0-25% of CaO and 0-5% of $ZrO_2$ as a composition expressed by mol % can be used, but the glass composition is not limited thereto.

More specifically, examples of glass compositions may include the following glass compositions (i) to (v). Here, for example, the phrase "contains 0-25% of MgO" means that MgO is not essential but may be contained up to 25%.

(i) A glass containing 63-73% of $SiO_2$, 0.1-5.2% of $Al_2O_3$, 10-16% of $Na_2O$, 0-1.5% of $K_2O$, 0-5.0% of $Li_2O$, 5-13% of MgO, and 4-10% of CaO as a composition expressed by mol % in terms of oxide; (ii) a glass containing 50-74% of $SiO_2$, 1-10% of $Al_2O_3$, 6-14% of $Na_2O$, 3-11% of $K_2O$, 0-5.0% of $Li_2O$, 2-15% of MgO, 0-6% of CaO and 0-5% of $ZrO_2$ as a composition expressed by mol % in terms of oxide, wherein the total content of $SiO_2$ and $Al_2O_3$ is 75% or less, the total content of $Na_2O$ and $K_2O$ is 12-25%, and the total content of MgO and CaO is 7-15%; (iii) a glass containing 68-80% of $SiO_2$, 4-10% of $Al_2O_3$, 5-15% of $Na_2O$, 0-1% of $K_2O$, 0-5.0% of $Li_2O$, 4-15% of MgO, and 0-1% of $ZrO_2$ as a composition expressed by mol % in terms of oxide; (iv) a glass containing 67-75% of $SiO_2$, 0-4% of $Al_2O_3$, 7-15% of $Na_2O$, 1-9% of $K_2O$, 0-5.0% of $Li_2O$, 6-14% of MgO, and 0-1.5% of $ZrO_2$ as a composition expressed by mol % in terms of oxide, wherein the total content of $SiO_2$ and $Al_2O_3$ is 71-75%, the total content of $Na_2O$ and $K_2O$ is 12-20%, and the content of CaO is less than 1% if contained; and (v) a glass containing 56-73% of $SiO_2$, 7-24% of $Al_2O_3$, 0-6% of $B_2O_3$, 0-6% of $P_2O_5$, 2-12 of $Li_2O$, 2-11% of $Na_2O$, 0-5% of $K_2O$, 0-8% of MgO, 0-2% of CaO, 0-5% of SrO, 0-5% of BaO, 0-5% of ZnO, 0-2% of $TiO_2$, and 0-4% of $ZrO_2$ as a composition expressed by mol % in terms of oxide.

In addition, when chemically strengthening treatment is performed on the glass plate, the total content of $Li_2O$ and $Na_2O$ in the glass composition is preferably 12 mol % or more in order to perform the chemically strengthening treatment properly. Further, as the content of $Li_2O$ in the glass composition increases, the glass transition point thereof decreases so that molding can be performed easily. Therefore, the content of $Li_2O$ is preferably 0.5 mol % or more, more preferably 1.0 mol % or more, and even more preferably 2.0 mol % or more. Further, in order to increase compressive stress (CS) of the surface and depth of layer (DOL) of the compressive stress layer, it is preferable that the glass composition of the glass plate has 60 mol % or more of $SiO_2$, and 8 mol % or more of $Al_2O_3$.

Raw materials of respective components are mixed to have the aforementioned composition, and heated and melted in a glass-melting furnace. The glass is homogenized by bubbling, stirring, addition of a clarifier, etc., and molded into a glass plate with a predetermined thickness by a known molding method. Then, the glass plate is gradually cooled down. Examples of a method for molding the glass include a float method, a press method, a fusion method, a downdraw method, and a rollout method. Particularly, the float process is preferred because it is suitable for mass production. In addition, continuous molding processes other than the float process, that is, the fusion process and the downdraw process are also preferred. The glass member molded into a flat plate-like shape by a desired molding process is gradually cooled down, and then cut into a desired size. If more proper dimensional accuracy is required, for example, polishing or edge-face finishing may be performed on the glass member, which has been cut. In this manner, cracking or chipping of the glass plate can be reduced in handling in a molding step or the like. Thus, the yield can be improved.

When the glass plate has a bent portion in at least one of the first main surface and the second main surface, it is preferable that the flat plate-like glass plate is formed into a predetermined shape. Here, the bent portion means a portion whose average curvature is not zero.

For the molding method, a self-weight molding method, a vacuum molding method, a press molding method, etc. can be used. Among them, the vacuum molding method is excellent as a method for forming the glass plate into a predetermined shape. The glass plate can be formed by the vacuum forming method without bringing one of the main surfaces into contact with a forming die. Therefore, embossed defects such as scratches or dents can be reduced. In addition, of those molding methods, two or more kinds of molding methods may be used together.

In the case where at least one main surface of the glass plate is polished, a polishing portion of a rotary polishing tool is, for example, brought into contact with the main surface with a fixed pressure, and moved at a fixed speed. Thus, the polishing can be performed. Due to the polishing on the conditions of the fixed pressure and the fixed speed, the surface to be polished can be polished uniformly at a fixed polishing rate. The pressure with which the polishing portion of the rotary polishing tool is brought into contact with the surface is preferably 1 to 1,000,000 Pa in terms of economy and easiness of control. The speed is preferably 1 to 10,000 mm/min in terms of economy and easiness of control. The amount of movement may be determined suitably in accordance with the shape of a base material or the like.

The rotary polishing tool is not particularly limited as long as the polishing portion thereof is a rotating body capable of performing polishing. It is possible to use a system in which the polishing tool is mounted on a spindle or Leutor having a tool chucking part. The kind of material of the rotary polishing tool is not particularly limited as long as at least the polishing portion thereof is made of a material such as a cerium pad, a rubber grindstone, felt buff, polyurethane, etc., which can process and remove a target to be processed and whose Young's modulus is preferably 7 GPa or less and more preferably 5 GPa or less. When the member whose Young's modulus is preferably 7 GPa or less is used as the material of the rotary polishing tool, the polishing portion can be deformed along the shape of the target by pressure so that a bottom face and a side face of the target can be processed to have predetermined surface roughness. Examples of the shape of the polishing portion of the rotary polishing tool include a circular or doughnut flat shape, a columnar shape, a shell shape, a disc shape, a barrel shape, etc.

In the case where the glass plate is polished by the polishing portion of the rotary polishing tool brought into contact therewith, the polishing is preferably performed with polishing abrasive slurry put between the glass plate and the polishing portion. In this case, examples of the polishing abrasive particles include silica, ceria, alundum, white alundum (WA), emery, zirconia, SiC, diamond, titania, germanium, etc. The particle size thereof is preferably 10 nm to 10 µm. The relative moving speed of the rotary polishing tool can be selected within the range of from 1 to 10,000 mm/min as described above. The rotational frequency of the polishing portion of the rotary polishing tool is 100-10,000 rpm. When the rotational frequency is low, the processing rate is slowed so that it may take too much time to obtain desired surface roughness. When the rotational frequency is high, the tool may be worn away too violently to easily control the polishing.

The rotary polishing tool and the glass plate may be moved relatively to each other along the shape of the glass plate to perform polishing the glass plate. Any system may be used as long as it is a system capable of controlling the amount of movement, the direction and the speed to be fixed. For example, a system using a multiaxial robot or the like can be used.

An edge face of the glass plate may be a face subjected to processing such as chamfering. Processing such as so-called R-chamfering or C-chamfering by mechanical grinding is preferable as the chamfering, but another processing such as etching may be used. The chamfering is not particularly limited.

When strengthening treatment is performed on at least one of the main surfaces of the glass plate, a compressive stress layer can be formed in the surface to enhance the strength and the scratch resistance. Either physically strengthening treatment or chemically strengthening treatment can be used as the strengthening treatment. The chemically strengthening treatment is preferred because plenty of compressive stress can be introduced even if the glass plate has a small thickness.

The chemically strengthening treatment is a treatment in which the glass plate is immersed in molten alkali metal salt at a temperature not higher than a glass transition temperature thereof, so that alkali metal ions (typically Li ions or Na ions) located in the outermost surface of the glass plate and each having a small ion radius are replaced by alkali metal ions each having a larger ion radius (typically Na ions for Li ions, or K ions for Na ions) to thereby form a compressive stress layer in the glass surface. The glass plate may be chemically strengthened by a conventionally known method.

Antiglare treatment is performed on the first main surface of the obtained glass plate. Thus, it is possible to obtain a glass plate satisfying the clarity index value T, the reflection image diffusiveness index value R, the anti-sparkle index value S and the transmission haze within the specified ranges.

Examples of a method for forming micro asperities in the first main surface by the antiglare treatment include a method in which etching is performed after frosting or sand blasting is performed, a wet blasting method, etc. It is difficult, however, to form a microstructure by the frosting method. In addition, abrasive particles are worn away by the sand blasting method. Therefore, it is difficult to repeat processing by the sand blasting method. Accordingly, it is preferable to use the wet blasting method for the antiglare treatment.

In the wet blasting method, wet blasting is performed on the glass plate or preferably, the glass plate subjected to the polishing. Wet blasting is a step in which slurry having a mixture of liquid such as water and particles (abrasive particles) as abrasive is pumped and delivered to a blast gun, accelerated by compressed air, and then injected to the first main surface of the glass plate to thereby perform surface roughening, cleaning, peening, etc. thereon.

Preferable conditions satisfying the aforementioned four optical properties are determined by changing the size of the abrasive particles, the distribution of the abrasive particles, the kind of the abrasive particles, the delivery pressure, the delivery time, the sweep velocity, the injection angle, the injection distance, etc. suitably in the wet blasting.

After the wet blasting, cleaning is performed. Next, steps of etching with hydrofluoric acid, cleaning, etc. are performed. Thus, the glass plate can be manufactured.

When an antireflection layer is formed on the glass plate, the antireflection layer can be applied onto the first main surface of the glass plate or on the surface of another functional layer formed on the first main surface by use of a spin coat method, a dip coat method, a cast method, a slit coat method, a spray coat method, an electrostatic spraying deposition method (ESD method), or the like, and then formed by use of a method of performing heating treatment in accordance with necessity, or a chemical vapor deposition method (CVD method) or a physical vapor deposition method (PVD method) such as a sputtering method or an PLD method performed on the surface of an adhesion layer.

Examples of a method for forming an antifouling layer, for example, a coating of a fluorine-containing organic silicon compound, in at least a part of the first main surface of the glass plate, include a method in which a composition of a silane coupling agent containing a fluoroalkyl group such as a perfluoroalkyl group or a fluoroalkyl group including a perfluoro(polyoxyalkylene) chain is applied onto the first main surface by a spin coat method, a dip coat method, a cast method, a slit coat method, a spray coat method or the like, and then heating treatment is performed thereon in accordance with necessity, a vacuum deposition method in which a fluorine-containing organic silicon compound is vapor-deposited on the surface of the adhesion layer, and then heating treatment is performed thereon in accordance with necessity, etc. Any method may be used as the method for forming the coating.

The composition for forming the coating is not particularly limited as long as it is, for example, a composition which contains a fluorine-containing hydrolyzable silicon compound and which can form the coating. The composition for forming the coating may contain optional components other than the fluorine-containing hydrolyzable silicon compound, or may be composed of only the fluorine-containing hydrolyzable silicon compound. Examples of the optional components include a hydrolyzable silicon compound containing no fluorine atom (hereinafter referred to as "non-fluorine hydrolyzable silicon compound"), a catalyst, etc., which can be used within a range not impairing the effect of the invention.

When the fluorine-containing hydrolyzable silicon compound and the optional non-fluorine are blended as the composition for forming the coating, the respective compounds may be blended as they are, or may be blended as their partial hydrolysis condensates respectively. Further, a mixture of the compounds with the partial hydrolysis condensates may be blended.

When two or more kinds of hydrolyzable silicon compounds are used in combination, the respective compounds may be blended in the composition for forming the coating as they are, or may be blended as their partial hydrolysis condensates respectively. Further, those compounds may be blended as a partial hydrolysis co-condensate of two or more kinds of compounds. Alternatively, a mixture of the compounds, the partial hydrolysis condensates and the partial hydrolysis co-condensate may be blended. However, when the coating is formed by vacuum deposition or the like, the partial hydrolysis condensates and the partial hydrolysis co-condensate to be used should have a degree of polymerization good enough to be vacuum-deposited. In the following description, the term "hydrolyzable silicon compound" will mean that it may include such a partial hydrolysis condensate and such a partial hydrolysis co-condensate as well as the compound itself.

The fluorine containing hydrolyzable silicon compound to be used for forming the coating of the fluorine containing hydrolyzable silicon compound is not particularly limited as long as the obtained coating of the fluorine containing hydrolyzable silicon compound has an antifouling property such as water repellency, oil repellency, etc.

Specifically, a fluorine containing hydrolyzable silicon compound containing at least one group selected from the group consisting of a perfluoropolyether group, a perfluoroalkylene group and a perfluoroalkyl group can be used. Those groups exist as fluorine containing organic groups each of which is bonded to a silicon atom of a hydrolyzable silyl group directly or through a linking group. For commercially available fluorine containing organic silicon compounds (fluorine containing hydrolyzable silicon compounds), each of which contains at least one group selected from a group consisting of a perfluoropolyether group, a perfluoroalkylene group and a perfluoroalkyl group, KP-801 (trade name, made by Shin-Etsu Chemical Co., Ltd.), X-71 (trade name, made by Shin-Etsu Chemical Co., Ltd.), KY-130 (trade name, made by Shin-Etsu Chemical Co., Ltd.), KY-178 (trade name, made by Shin-Etsu Chemical Co., Ltd.), KY-185 (trade name, made by Shin-Etsu Chemical Co., Ltd.), KY-195 (trade name, made by Shin-Etsu Chemical Co., Ltd.), Afluid® S-550 (trade name, made by AGC Inc.), Optool® DSX (trade name, made by Daikin Industries, Ltd.), etc. may be preferably used. Among them, KY-185, KY-195, Optool DSX and S-550 are preferred.

The composition for forming the coating, which contains such a fluorine containing hydrolyzable silicon compound, is deposited to the surface of the adhesion layer to react therewith so as to be formed as a coating. Thus, the coating of the fluorine containing organic silicon compound can be obtained. In order to accelerate the reaction, heating treatment or humidifying treatment may be performed in accordance with necessity after the formation of the coating. As for a specific coating forming method and specific reaction conditions, conventionally known methods, conditions, etc. can be used.

A static friction coefficient of the outermost surface where the antifouling layer has been formed is preferably 1.0 or less, more preferably 0.9 or less, and even more preferably 0.8 or less. When the static friction coefficient is 1.0 or less, good feeling with a human finger can be obtained when the outermost surface of the glass plate is touched by the finger.

Meanwhile, when the glass plate has a bent portion, a dynamic friction coefficient of the bent portion is preferably 0.02 or less, more preferably 0.015 or less, and even more preferably 0.01 or less. In the case where the dynamic friction coefficient is 0.02 or less, good feeling with a human finger can be obtained when the bent portion is touched by the finger.

The static friction coefficient of the outermost surface and the dynamic friction coefficient of the bent portion can be measured, for example, as follows. In a tactile sense evaluation meter TL201 Ts made by Trinity Lab, Inc., an artificial finger contactor made by the same company is placed on the main surface of the glass with a load of 30 g applied thereto. This is moved on the main surface of the glass at a speed of 10 mm/sec to measure the static friction coefficient and the dynamic friction coefficient. A friction coefficient with which the contactor standing still starts to move is defined as the static friction coefficient, and a friction coefficient with which the contactor is moving is defined as the dynamic coefficient.

(Modifications)

An antiglare film is formed on the glass plate. The antiglare film is a film, which mainly scatters reflected light to provide an effect of reducing glare of the reflected light caused by reflection of the light source.

The antiglare film can be obtained by baking a coating of a composition which contains at least one of a silica precursor and particles, and a liquid medium, and which may contain other components than the silica precursor and the particles according to necessity. In addition, the antiglare film can be formed by electrostatic coating.

Here, the silica precursor means a substance, which can form a matrix having $SiO_2$ as its major component when the substance is baked.

When the composition contains the silica precursor, the matrix of the antiglare film includes a matrix having silica as its major component and derived from the silica precursor. The antiglare film may be formed of the particles, or may have the particles dispersed in the aforementioned matrix.

As the liquid medium, the composition contains, for example, a liquid medium whose boiling point is 150° C. or lower. The content of the liquid medium whose boiling point is 150° C. or lower is preferably 86% or more by mass with respect to the total amount of the liquid medium.

Maximum height roughness Rz in the surface of the antiglare film is preferably 0.2-5 μm, more preferably 0.3-4.5 μm, and even more preferably 0.5-4.0 μm. When the maximum height roughness Rz in the surface of the antiglare film is not lower than the lower limit of the aforementioned range, the antiglare effect can be sufficiently shown. When the maximum height roughness Rz in the surface of the antiglare film is not higher than the upper limit of the aforementioned range, reduction of contrast in an image can be prevented satisfactorily. The maximum height roughness Rz can be measured according to JIS B 0601-2001.

The glass plate may have a printed layer. When the printed layer is provided, it is possible to obtain an effect of clearly showing a position of a button to a user to thereby improve the operability, or an effect of hiding wirings for a touch panel to thereby improve the ornamental design.

The printed layer is preferably provided on at least a part of the second main surface, and provided by a known method or on known conditions.

[Applications]

Applications of the glass plate according to the invention are not particularly limited, but will be described below.

Specific examples of the applications include a transparent part for a vehicle (such as a headlight cover, a side mirror, a front transparent substrate, a side transparent substrate, a rear transparent substrate, an in-vehicle display, a cover glass for an in-vehicle display, etc.), a meter, a building window, a show window, a display (such as a notebook type personal computer, a monitor, an LCD, a PDP, an ELD, a CRT, a PDA, etc.), an LDC color filter, a touch panel substrate, a pickup lens, an optical lens, a spectacle lens, a camera part, a video part, a CCD cover substrate, an optical fiber edge face, a projector part, a copying machine part, a solar cell transparent substrate (such as a cover glass), a cellar phone window, a backlight unit part (such as a light guide plate, a cold cathode tube, etc.), a backlight unit part liquid crystal luminance improving film (such as a prism, a semitransparent film, etc.), a liquid crystal luminance improving film, an organic EL light emitting device part, an inorganic EL light emitting device part, a fluorescence light emitting device part, an optical filter, an edge face of an optical part, an illumination lamp, a cover of a lighting device, an amplification laser light source, antireflection film, a polarizing film, an agricultural film, etc.

In particular, the glass plate is preferably used for applications where a distance between the glass plate and a person who visually recognizes the glass plate is fixed. That is, the glass plate is preferably used as the cover glass for an in-vehicle display among the transparent parts for vehicles.

Examples of the in-vehicle display include a meter panel called a cluster including a speedometer, a CID (Center Information Display) of a car navigation or a display audio, an RSE (Rear Seat Entertainment), an HUD (Head-Up Display), a TFT liquid crystal display (TFT-LCD) for an electronic mirror (back mirror/side mirror) for a camera monitoring system, an AM-OLED (Active Matrix Organic Light Emitting Diode), etc.

According to one embodiment of the present invention, a display device has the aforementioned glass plate and a light emitting body. Examples of the light emitting body include an organic EL, an OLED (Organic Light Emitting Diode), a light source for a liquid crystal display (LED), a micro-LED, a fluorescent body, etc. Examples of the display device include an organic EL display, an OLED display, an LCD, a micro-LED display, a plasma display, etc.

The glass plate in the display device is disposed so that the first main surface side of the glass plate faces on the visual recognition side. The display device has excellent reproducibility of color as well as good clarity, good reflection image diffusiveness, and good anti-sparkle.

EXAMPLES

Examples will be described below to explain the present invention in detail. However, the invention is not limited by the following description.

<Evaluation Method>

(Clarity Index Value T)

A glass plate (measuring 100 mm×100 mm×1.3 mmt) was placed in a position 30 mm away from the top of a slit-like white light source of 40 mm long and 0.1 mm wide, so that the first main surface side of the glass plate faced on the light source side. Light transmitted through the glass plate and an angle θ thereof were detected from above the glass plate by use of SMS-1000 (analyzer) made by DM&S (Display-Messtechnik & Systeme GmbH & Co. KG). Thus, luminance at each part was measured. In addition, as a camera lens, C1614A lens having a focal length of 16 mm was used with an aperture of 5.6, and a distance between the first main surface of the glass plate and the camera lens was set at 550 mm.

When a direction parallel to the thickness direction of the glass plate is regarded as an angle θ=0°, an average value of luminance within a range of the angle θ=0°±0.1° is taken as $T_1$, an average value of luminance within a range of the angle θ=0.7°±0.1° is taken as $T_2$, and an average value of luminance within a range of the angle θ=−0.7°±0.1° is taken as $T_3$, and the clarity index value T is a value calculated by the following expression (1).

$$\text{clarity index value } T = 1 - (T_2 + T_3)/(2 \times T_1) \quad \text{expression (1)}$$

(Reflection Image Diffusiveness Index Value R)

The glass plate (measuring 100 mm×100 mm×1.3 mmt) was placed so that the first main surface side faced up. From above the first main surface side, slit-like light of 101 mm wide was radiated, and luminance of light reflected thereon was measured by the SMS-1000 made by DM&S GmbH & Co. KG. On this occasion, a mat black plate was placed on the second main surface side in order to eliminate reflected light (back surface reflection) from the second main surface. As a camera lens, C1614A lens having a focal length of 16 mm was used with an aperture of 5.6. A distance between the first main surface of the glass plate and the camera lens was set at 300 mm, and an imaging scale was set within a range of 0.0276-0.0278.

When a direction parallel to the thickness direction of the glass plate is regarded as an angle $\phi=0°$, the aforementioned light is radiated from an angle $\phi=5.7°\pm0.1°$, and the angle $\phi=-5.7°$ at specular reflection is regarded as reference (an angle $\alpha=0°$). When an average value of luminance of the reflected light within a range of the angle $\alpha=0°\pm0.1°$ is taken as $R_1$, an average value of luminance of the reflected light within a range of the angle $\alpha=0.5°\pm0.1°$ is taken as $R_2$, and an average value of luminance of the reflected light within a range of the angle $\alpha=-0.5°\pm0.1°$ is taken as $R_3$, the reflection image diffusiveness index value R is a value calculated by the following expression (2).

$$\text{reflection image diffusiveness index value } R=(R_2+R_3)/(2\times R_1) \quad \text{expression(2)}$$

$$\text{reflection image diffusiveness index value } R=(R_2+R_3)/(2\times R_1) \quad \text{expression (2)}$$

(Anti-Sparkle Index Value S)

The glass plate (measuring 100 mm×100 mm×1.6 mmt) was disposed so that the second main surface of the glass plate contacted with the display surface side of a display device (iPad-Air®, made by Apple Inc.) with a resolution of 264 ppi. With a single-color image of green composed of RGB (0, 255, 0) being displayed on the display device, a sparkle value obtained by image analysis using the SMS-1000 made by DM&S GmbH & Co. KG, which was placed above the glass plate. The sparkle value thus obtained was regarded as sparkle $S_a$. A distance d between a solid-state image sensor and the glass plate was set at 540 mm, and as a camera lens, 23FM50SP lens having a focal length of 50 mm was used with an aperture of 5.6.

A glass substrate (VRD140 glass; made by AGC Glass Europe) having the same scale (measuring 100 mm×100 mm×1.6 mmt) as the aforementioned glass plate was used as a reference sample, and image analysis was performed under similar conditions. A sparkle value thus obtained was regarded as $S_s$.

From the values $S_a$ and $S_s$, the anti-sparkle index value S is calculated by the following expression (3).

$$\text{anti-sparkle index value } S=1-(S_a/S_s) \quad (3)$$

(Transmission Haze)

The transmission haze was measured by a method according to JIS K 7136 (2000).

Specifically, the glass plate was placed above a light source so that the first main surface side of the glass plate faced on the light source side, and transmitted light was measured from above the glass plate by use of a haze meter HZ-1 made by Suga Test Instruments Co., Ltd.

When a direction parallel to the thickness direction of the glass plate was regarded as an angle of 0°, light detected within ±2.5° was regarded as transmitted light, and light detected below −2.5° or beyond 2.5° was regarded as scattered light (transmitted light loss). A ratio of the scattered light to the sum of the transmitted light and the scattered light, i.e., the total amount of light transmission, was regarded as transmission haze (%).

(Reproducibility of Color)

As evaluation of reproducibility of color, clearness of black was evaluated.

Printing in black ink A (Ink HF GV3 made by Seiko advance Ltd.) or black ink B (Sumiichi, made by Teikoku Printing Inks Mfg. Co., Ltd.) was performed on the second main surface side of the glass plate, and the other part of the second main surface than the printed part was masked (white). The glass plate was placed so that the first main surface of the glass plate faced up, and a black tone in the printed part viewed from above the glass plate and a black tone of the black ink A or the black ink B itself were compared with each other. Evaluation was performed by visual recognition (sensory evaluation) of nine examinees (30 s to 60 s).

The evaluation was performed in the following manner.

A: The actual ink color and the ink color visually recognized from above the glass plate were substantially the same, and cannot be distinguished. B: The actual ink color and the ink color visually recognized from above the glass plate were not exactly the same, but can be regarded as the same. C: The actual ink color and the ink color visually recognized from above the glass plate were determined as different.

Examples and Comparative Examples

Dragontrail® (made by AGC Inc., with a thickness (t) of 1.3 mmt) was prepared as the glass plate, and cut into a size measuring 500 mm×400 mm by a diamond cutter. A sharp edge portion generated by the cutting was ground by a grindstone #400 so as to be formed into a C-chamfered shape.

Next, antiglare treatment was performed on one main surface of the glass plate by a wet blasting method. The main surface subjected to the antiglare treatment was regarded as the first main surface.

Slurry in which white alumina particles (WA) or alumina particles (A) shown in Table 1 were dispersed as abrasive particles in water at a ratio of abrasive particles:water=1:10 (weight ratio) was pumped and delivered to a blast gun, accelerated by compressed air, and injected to the first main surface of the glass plate. Thus, surface roughening was performed. The treatment conditions in the surface roughening, such as the delivery pressure (pressure [MPa]), the injection distance [mm], the injection angle [deg], and the sweep velocity [mm/s], are shown in Table 1.

After the wet blasting, cleaning with water was performed. Next, steps of etching with hydrofluoric acid, and cleaning were performed. Thus, the glass plate subjected to the antiglare treatment was obtained. The amount of etching [μm] with the hydrofluoric acid is shown in Table 1.

Results of the clarity index value T, the reflection image diffusiveness index value R, the anti-sparkle index value S, the transmission haze (%) and the evaluation of reproducibility of color in the obtained glass are shown in Table 1.

TABLE 1

|  | Example 1 | Example 2 | Example 3 | Example 4 | Example 5 | Comp. Ex. 1 | Comp. Ex. 2 |
|---|---|---|---|---|---|---|---|
| kind of abrasive particles | WA | WA | WA | WA | WA | WA | WA |
| grindstone number | 4000 | 4000 | 6000 | 6000 | 6000 | 4000 | 4000 |
| pressure [MPa] | 0.1 | 0.1 | 0.25 | 0.15 | 0.25 | 0.1 | 0.17 |
| injection distance [mm] | 70 | 70 | 100 | 100 | 50 | 70 | 70 |
| injection angle [deg] | 90 | 90 | 90 | 90 | 45 | 90 | 90 |
| sweep velocity [mm/s] | 10 | 10 | 300 | 300 | 300 | 10 | 10 |
| Amount of etching [μm] | 4.4 | 8.9 | 8.7 | 42.2 | 31 | 80 | 4.4 |
| clarity index value T | 0.971 | 0.961 | 0.977 | 0.981 | 0.968 | 0.864 | 0.940 |
| reflection image diffusiveness index value R | 0.013 | 0.023 | 0.012 | 0.012 | 0.014 | 0.234 | 0.025 |
| anti-sparkle index value S | 0.925 | 0.879 | 0.964 | 0.888 | 0.851 | 0.598 | 0.879 |
| transmission haze (%) | 6.8 | 7.6 | 7.4 | 1.3 | 3.4 | 4.6 | 24.2 |
| reproducibility of color | A | A | A | A | A | A | B |

|  | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|
| kind of abrasive particles | WA | WA | A | A | A | WA | WA |
| grindstone number | 4000 | 4000 | 2000 | 2000 | 2000 | 6000 | 6000 |
| pressure [MPa] | 0.2 | 0.2 | 0.1 | 0.2 | 0.2 | 0.25 | 0.25 |
| injection distance [mm] | 70 | 70 | 70 | 70 | 70 | 100 | 25 |
| injection angle [deg] | 90 | 90 | 90 | 90 | 90 | 45 | 75 |
| sweep velocity [mm/s] | 10 | 10 | 10 | 10 | 100 | 300 | 300 |
| Amount of etching [μm] | 4.4 | 8.9 | 8 | 8 | 6 | 6.4 | 29 |
| clarity index value T | 0.922 | 0.880 | 0.741 | 0.327 | 0.297 | 0.986 | 0.752 |
| reflection image diffusiveness index value R | 0.044 | 0.111 | 0.259 | 0.992 | 1.000 | 0.006 | 0.367 |
| anti-sparkle index value S | 0.877 | 0.842 | 0.829 | 0.906 | 0.921 | 0.970 | 0.758 |
| transmission haze (%) | 33.7 | 32.1 | 47.4 | 68.2 | 74 | 0.1 | 23.6 |
| reproducibility of color | C | C | C | C | C | A | B |

WA = white alumina,
A = alumina

As a result, it was confirmed that the reproducibility of color is more excellent as the value of the transmission haze is lower, and it was proved that good reproducibility of color could be obtained if the value of the transmission haze is 15% or less.

Further, it was proved that a glass plate having suitable clarity, suitable reflection image diffusiveness and suitable anti-sparkle can be obtained if it satisfies the clarity index value T≥0.8, the reflection image diffusiveness index value R≥0.01, and the anti-sparkle index value S≥0.85.

INDUSTRIAL APPLICABILITY

When a glass plate according to the present invention is applied to a display device, it is possible to provide a display device excellent in clarity, reflection image diffusiveness and anti-sparkle and also excellent in reproducibility of color in a displayed image.

Preferred embodiments of the invention have been described above in detail. However, the invention is not limited to any specified one of the aforementioned embodiments. Various changes or modifications can be made within the scope of the gist of the invention described in the claims.

The present application is based on Japanese Patent Application No. 2018-006517 filed on Jan. 18, 2018, the contents of which are incorporated herein by reference.

DESCRIPTION OF REFERENCE NUMERALS AND SIGNS

50 glass plate
51 black plate
52 first main surface
53 second main surface
54 display device
60 antiglare-treated layer
61 printed layer
70A,70B,70C measuring apparatus
71 light source
75 detector (analyzer)
731 second light
733 first reflected light
735 second reflected light
737 third reflected light

The invention claimed is:

1. A glass plate comprising a first main surface subjected to antiglare treatment, and a second main surface opposed to the first main surface, wherein:
   a clarity index value T, a reflection image diffusiveness index value R and an anti-sparkle index value S quantified by methods shown below satisfy respective relations of:
   clarity index value T≥0.8;
   reflection image diffusiveness index value R≥0.01; and
   anti-sparkle index value S≥0.85; and
   a transmission haze measured by a method according to JIS K 7136 (2000) is 15% or less,
   wherein:
   clarity index value T: when a direction parallel to a thickness direction of the glass plate is regarded as an angle θ=0°, an average value of luminance within a range of the angle θ=0°±0.1° is taken as $T_1$, an average value of luminance within a range of the angle θ=0.7°±0.1° is taken as $T_2$, and an average value of luminance within a range of the angle θ=−0.7°±0.1° is taken as $T_3$, and the clarity index value T is a value calculated by the following expression (1):

$$\text{clarity index value } T = 1 - (T_2 + T_3)/(2 \times T_1) \quad \text{expression (1)},$$

reflection image diffusiveness index value R: when a direction parallel to the thickness direction of the glass plate is regarded as an angle $\phi=0°$, the light is radiated from an angle $\phi=5.7°±0.1°$, and the angle $\phi=-5.7°$ at specular reflection is regarded as reference (an angle $\alpha=0°$), an average value of luminance of the reflected light within a range of the angle $\alpha=0°±0.1°$ is taken as $R_1$, an average value of luminance of the reflected light within a range of the angle $\alpha=0.5°±0.1°$ is taken as $R_2$, and an average value of luminance of the reflected light within a range of the angle $\alpha=-0.5°±0.1°$ is taken as $R_3$, the reflection image diffusiveness index value R is a value calculated by the following expression (2):

reflection image diffusiveness index value $R=(R_2+R_3)/(2×R_1)$   expression (2), anti-sparkle index value S: when the glass plate is disposed so that the second main surface of the glass plate contacts with a display surface side of a display device with a resolution of 264 ppi; with a single-color image of green composed of RGB (0, 255, 0) being displayed on the display device, a sparkle value is obtained by image analysis, the sparkle value obtained as sparkle $S_a$; a distance d between a solid-state image sensor and the glass plate is set at 540 mm, and as a camera lens, lens having a focal length of 50 mm is used with an aperture of 5.6; a glass substrate having the same thickness as the aforementioned glass plate is also used as a reference sample, and image analysis is performed under similar conditions; a sparkle value thus obtained is regarded as $S_s$; the values $S_a$ and $S_s$, the anti-sparkle index value S is calculated by the following expression (3):

anti-sparkle index value $S=1-(S_a/S_s)$   expression (3).

2. The glass plate according to claim 1, wherein:
the clarity index value T, the reflection image diffusiveness index value R and the anti-sparkle index value S satisfy respective relations of:
the clarity index value T≥0.85;
the reflection image diffusiveness index value R≥0.02; and
the anti-sparkle index value S≥0.88; and
the transmission haze is 7% or less.

3. The glass plate according to claim 1, wherein an antireflection layer is provided on at least a part of the first main surface.

4. The glass plate according to claim 1, wherein an antifouling layer is provided on an outermost surface of the first main surface side.

5. The glass plate according to of claim 1, wherein a printed layer is provided on at least a part of the second main surface.

6. The glass plate according to claim 1, wherein the glass plate is soda-lime glass or aluminosilicate glass.

7. The glass plate according to claim 1, wherein at least one of the first main surface and the second main surface is subjected to chemically strengthening treatment.

8. The glass plate according to claim 1, wherein a bent portion is provided in at least one of the first main surface and the second main surface.

9. A display device comprising the glass plate according to claim 1, and a light emitting body.

* * * * *